(12) United States Patent
Yen et al.

(10) Patent No.: US 7,747,071 B2
(45) Date of Patent: Jun. 29, 2010

(54) DETECTING AND CORRECTING PETEYE

(75) Inventors: Jonathan Yen, San Jose, CA (US);
Daniel Tretter, San Jose, CA (US);
Huitao Luo, Sunnyvale, CA (US); Suk Hwan Lim, San Mateo, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1215 days.

(21) Appl. No.: 11/260,636

(22) Filed: Oct. 27, 2005

(65) Prior Publication Data
US 2007/0098260 A1 May 3, 2007

(51) Int. Cl.
*G06K 9/00* (2006.01)
(52) U.S. Cl. ............... 382/165; 382/162; 382/164; 382/167; 382/173; 382/254; 382/275
(58) Field of Classification Search .......... 382/167, 382/173, 275
See application file for complete search history.

(56) References Cited

U.S. PATENT DOCUMENTS

| | | | |
|---|---|---|---|
| 5,432,863 A * | 7/1995 | Benati et al. ............... 382/167 |
| 6,009,209 A | 12/1999 | Acker et al. |
| 6,016,354 A | 1/2000 | Lin et al. |
| 6,292,574 B1 * | 9/2001 | Schildkraut et al. ......... 382/117 |
| 6,307,954 B1 | 10/2001 | Lin et al. |
| 6,332,038 B1 * | 12/2001 | Funayama et al. .......... 382/190 |
| 6,728,401 B1 | 4/2004 | Hardeberg |
| 6,873,743 B2 | 3/2005 | Steinberg |
| 6,980,691 B2 * | 12/2005 | Nesterov et al. ............ 382/165 |
| 2002/0136450 A1 | 9/2002 | Chen et al. |
| 2002/0176623 A1 | 11/2002 | Steinberg |
| 2003/0007687 A1 | 1/2003 | Nesterov et al. |
| 2003/0044042 A1 | 3/2003 | King et al. |
| 2003/0202105 A1 | 10/2003 | Gaubatz et al. |
| 2004/0037460 A1 * | 2/2004 | Luo et al. ................... 382/165 |
| 2004/0184670 A1 | 9/2004 | Jarman et al. |
| 2004/0213476 A1 | 10/2004 | Luo et al. |
| 2005/0036704 A1 * | 2/2005 | Dumitras et al. ............ 382/260 |
| 2005/0047655 A1 * | 3/2005 | Luo et al. ................... 382/167 |

(Continued)

FOREIGN PATENT DOCUMENTS

WO    WO99/17254    4/1999

(Continued)

OTHER PUBLICATIONS

Gaubatz, M. et al., "Automatic red-eye detection and correction," 2002 International Conference on Image Processing, vol. 1, pp. 804-807 (2002).

(Continued)

*Primary Examiner*—Matthew C Bella
*Assistant Examiner*—Eric Rush

(57) ABSTRACT

Peteye is the appearance of an unnatural coloration (not necessarily red) of the pupils in an animal appearing in an image captured by a camera with flash illumination. Systems and methods of detecting and correcting peteye are described. In one aspect a classification map segmenting pixels in the input image into peteye pixels and non-peteye pixels is generated based on a respective segmentation condition on values of the pixels. Candidate peteye pixel areas are identified in the classification map. The generating and the identifying processes are repeated with the respective condition replaced by a different respective segmentation condition on the pixel values.

22 Claims, 10 Drawing Sheets

U.S. PATENT DOCUMENTS

2005/0047656 A1    3/2005    Luo et al.

FOREIGN PATENT DOCUMENTS

WO    WO 9917254 A1  *  4/1999

OTHER PUBLICATIONS

R-L Hsu, M. Abdel-Mottaleb and A.K. Jain, "Face Detection in Color Images," ICIP, Thessaloniki, 2001.

"Better Pictures, More Choices," Eastman Kodak Company, (Feb. 5, 2002).

"Industry's first completely automatic red eye detection and reduction system launched," Pictos Technologies, Inc. (Apr. 2002).

"Red-Eye Removal," Pixology—Product Categories, (before Apr. 2003).

Paul Viola and Michael J. Jones, "Robust Real-Time Object Detection," Cambridge Research Reports Technical Report Series (Feb. 2001).

Chrisophe Garcia & Georgios Tziritas, "Face Detection Using Quantized Skin Color Regions Merging and Wavelet Packet Analysis," IEEE Transactions on Multimedia, vol. 1, No. 3 S, 1999.

R. Ulichney, M. Gaubatz, JM Van Thong, "RedBot—a tool for improving red-eye correction", Eleventh Color Imaging Conf., (The Society for Imaging Science and Technology), Scot, 2003.

Jonathan Yen et al., "Redeye selection in semiautomatic mode," Research Disclosure, p. 546, May 2005.

* cited by examiner

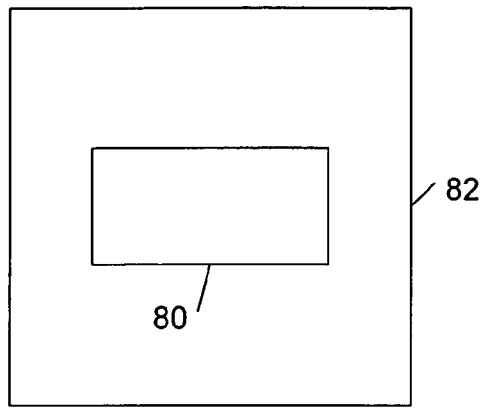
FIG. 12A
FIG. 12B
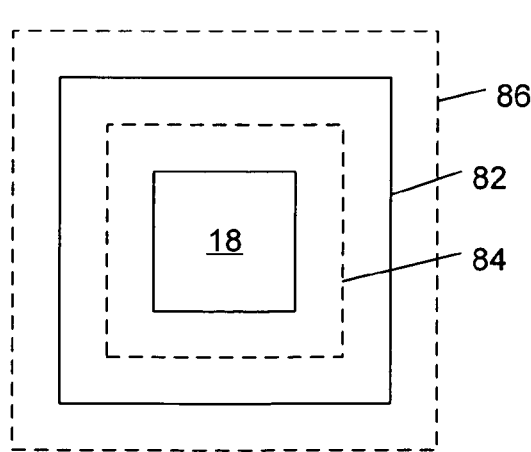
FIG. 13A
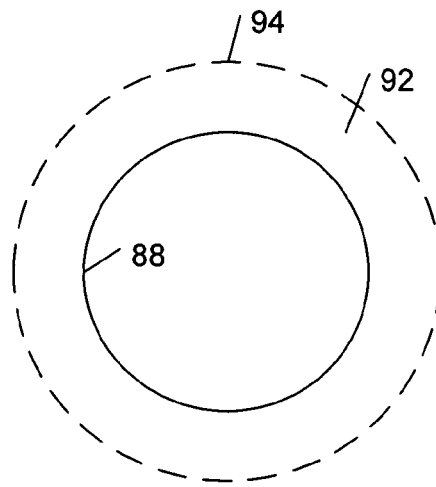
FIG. 13B

DETECTING AND CORRECTING PETEYE

CROSS-REFERENCE TO RELATED APPLICATIONS

This application relates to the following co-pending applications, each of which is incorporated herein by reference: U.S. patent application Ser. No. 10/424,419, filed Apr. 28, 2003, by Huitao Luo et al., and entitled "DETECTING AND CORRECTING RED-EYE IN A DIGITAL IMAGE;" U.S. patent application Ser. No. 10/653,019, filed on Aug. 29, 2003, by Huitao Luo et al., and entitled "DETECTING AND CORRECTING RED-EYE IN AN IMAGE;" and U.S. patent application Ser. No. 10/653,021, filed on Aug. 29, 2003, by Huitao Luo et al., and entitled "SYSTEMS AND METHODS OF DETECTING AND CORRECTING REDEYE IN AN IMAGE SUITABLE FOR EMBEDDED APPLICATIONS."

BACKGROUND

Redeye is the appearance of an unnatural reddish coloration in the pupils of a person appearing in an image captured by a camera with flash illumination. Peteye is the appearance of an unnatural coloration (not necessarily red) of the pupils in an animal appearing in an image captured by a camera with flash illumination. Redeye and peteye are caused by light from the flash illumination reflecting off the retina and returning to the camera. Redeye typically results from light reflecting off blood vessels in the retina, whereas peteye typically results from light reflecting off a reflective layer of the retina.

Image processing techniques have been proposed for detecting and correcting redeye in color images of humans. These techniques typically are semi-automatic or automatic. Semi-automatic redeye detection techniques rely on human input. For example, in some semi-automatic redeye reduction systems, a user must manually identify to the system the areas of an image containing redeye before the defects can be corrected. Many automatic human redeye reduction systems rely on a preliminary face detection step before redeye areas are detected. A common automatic approach involves detecting human faces in an image and, subsequently, detecting eyes within each detected face. After the eyes are located, redeye is identified based on shape, coloration, and brightness of image areas corresponding to the detected eye locations.

Detecting and correcting peteye are significantly more difficult than detecting and correcting redeye because peteye may be any of a variety of colors and face detection cannot be used to localize peteyes in an image. In addition, the reflective retinal layer that is present in the eyes of many animals, such as dogs and cats, can cause a variety of peteye colors as well as brightly glowing large white peteyes. Although techniques for detecting and correcting redeye in images may be used to correct some peteyes, such systems and methods cannot satisfactorily detect and correct the majority of peteyes that appear in images. What are needed are systems and methods that are designed specifically to detect and correct peteyes in images.

SUMMARY

In one aspect of the invention, a classification map segmenting pixels in the input image into peteye pixels and non-peteye pixels is generated based on a respective segmentation condition on values of the pixels. Candidate peteye pixel areas are identified in the classification map. The generating and the identifying processes are repeated with the respective condition replaced by a different respective segmentation condition on the pixel values.

In another aspect of the invention, pixels in the input image are segmented into an animal-fur color class and a non-animal-fur color class. Candidate peteye pixel areas corresponding to respective clusters of pixels in the non-animal-fur color class are identified in the input image. Ones of the identified candidate peteye pixel areas are selected as detected peteye pixel areas. Ones of the pixels in the detected peteye pixel areas are recolored.

In another aspect of the invention, pixels in the input image are segmented into peteye pixels and non-peteye pixels based on a mapping of the input image pixels into a one-dimensional luminance space. Candidate peteye pixel areas are identified in the input image based on the segmented peteye pixels. Ones of the identified candidate peteye pixel areas are selected as detected peteye pixel areas. Ones of the pixels in the detected peteye pixel areas are recolored.

Other features and advantages of the invention will become apparent from the following description, including the drawings and the claims.

DESCRIPTION OF DRAWINGS

FIG. 12A is an exemplary grayscale iris area surrounded by a neighborhood area.

FIG. 12B is another exemplary grayscale iris area surrounded by a set of eight neighborhood areas.

FIG. 13A shows inner and outer bounding regions derived from a peteye pixel area and a corresponding grayscale iris pixel area.

FIG. 13B shows inner and outer peteye pixel corrections regions used in an embodiment of a method of correcting peteye in an image.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. System Overview

The embodiments that are described in detail below are designed specifically to detect and correct peteyes in images. As a result, these embodiments are capable of satisfactorily detecting and correcting the majority of peteyes that appear in images. Some of these embodiments are able to detect a wide variety of different peteyes using multiple classification maps that segment pixels into peteye pixels and non-peteye pixels. Each of the classification maps is generated based on a different respective segmentation condition on the values of the pixels, where each segmentation condition is selected to increase the contrast between the pixels typically contained in a respective type of peteye area and surrounding non-peteye pixels. In some embodiments, the contrast between peteye pixels and non-peteye pixels is increased by segmenting pixels into a specified animal-fur color class and a non-animal-fur color class. In addition, some of these embodiments apply type-specific peteye color correction processes to the peteye pixels in the detected peteye pixel areas to generate a corrected image.

Figure 1:
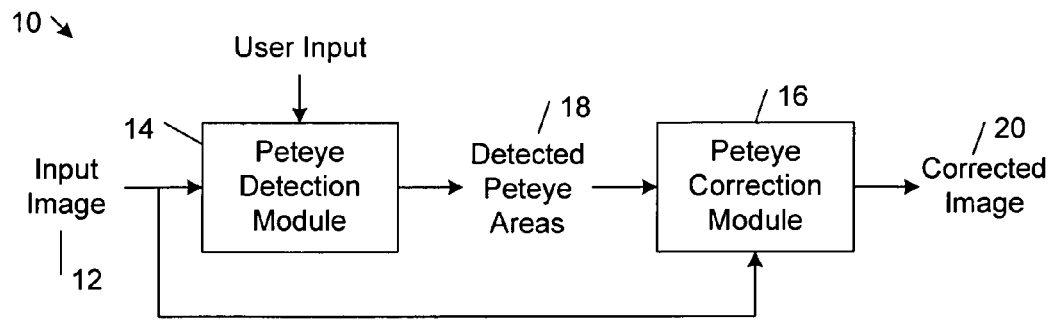
FIG. 1 is a block diagram of an embodiment of a system for detecting and correcting peteye in an image.

FIG. 1 shows an embodiment of a system 10 for detecting and correcting peteye pixels in an input image 12 that includes a peteye detection module 14 and a peteye correction module 16. The input image 12 may correspond to any type of image, including an original image that was captured by an image sensor (e.g., a video camera, a still image, or an optical scanner) or a processed (e.g., sub-sampled, filtered, reformatted, enhanced or otherwise modified) version of such an original image.

The peteye detection module 14 semi-automatically detects areas 18 in input image 12 likely to contain peteye. In particular, the peteye detection module 14 automatically detects candidate peteye pixel areas in the input image 12 and selects ones of the candidate peteye pixel areas as the detected peteye pixel areas 18 based on the user's selection of areas of the input image 12 coincident with respective ones of the candidate peteye pixel areas. The peteye correction module 16 automatically corrects the detected peteye areas 18 by applying type-specific peteye color correction processes to the peteye pixels in the detected peteye pixel areas 18 to generate a corrected image 20. In some cases, multiple type-specific color correction processes will apply to a detected peteye area 18. In these cases, the user may have the peteye correction module 16 apply multiple ones of the applicable type-specific color correction processes to the peteye pixels in the corrected ones of detected peteye pixel areas 18.

In some embodiments, the peteye detection module 14 and the peteye correction module sequentially process the input image 12 with respect to each peteye type. In other embodiments, the peteye detection module 14 detects all peteye types in the input image 12 and then the peteye correction module 16 corrects the detected peteyes that are selected by the user.

In general, the peteye detection module 14 and the peteye correction module 16 are not limited to any particular hardware or software configuration, but rather they may be implemented in any computing or processing environment, including in digital electronic circuitry or in computer hardware, firmware, device driver, or software. The peteye detection module 14 and the peteye correction module 16 may be incorporated into any system or method in which such functionality is desired, including embedded environments, which typically have limited processing and memory resources. For example, the peteye detection module 14 and the peteye correction module 16 may be embedded in the hardware of any one of a wide variety of electronic devices, including digital cameras, printers, and portable electronic devices (e.g., mobile phones and personal digital assistants).

II. Detecting Peteye Pixel Areas

A. Peteye Detection Module Overview

Figure 2:
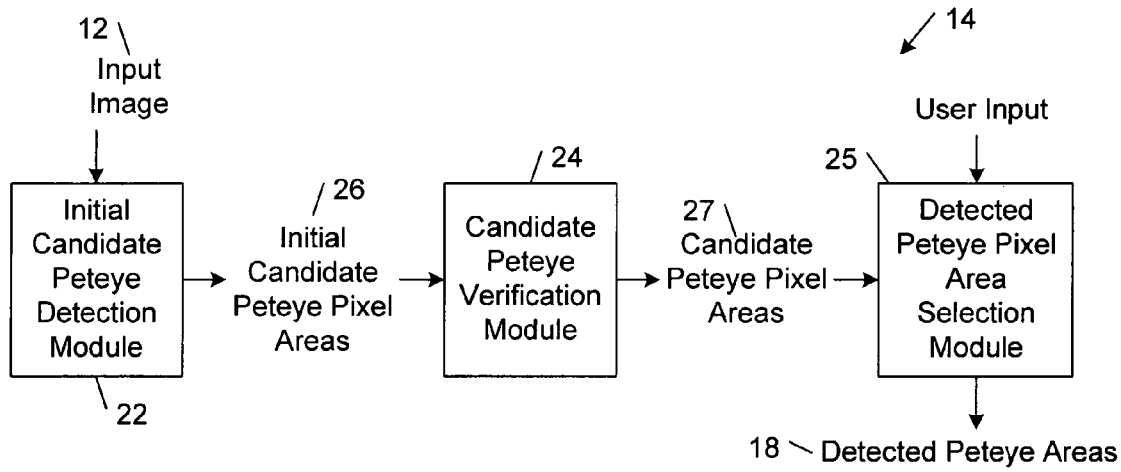
FIG. 2 is a block diagram of components of an embodiment of a peteye detection module.

Referring to FIG. 2, in some embodiments, the peteye detection module 14 includes an initial candidate detection module 22, a candidate peteye verification module 24, and a detected peteye pixel area selection module 25. The initial candidate detection module 22 identifies a set of initial candidate peteye pixel areas 26 in the input image 12, and the candidate peteye verification module 24 filters false alarms (i.e., candidate peteye pixel areas with a low likelihood of corresponding to actual peteyes in input image 12) from the set of initial candidate peteye pixel areas 26 to produce a set of candidate peteye pixel areas 27. The detected peteye pixel area selection module 25 selects the set of detected peteye areas 18 from the set of candidate peteye pixel areas based on user input.

B. Initial Candidate Detection Module

1. Overview

As explained in detail below, in some embodiments, initial candidate detection module 22 identifies candidate peteye pixel areas using multiple classification maps that segment pixels into peteye pixels and non-peteye pixels based on different respective segmentation conditions. In this way, initial candidate detection module 22 ensures that there is a high likelihood that all of the actual peteyes in the input image 12 are included in the set of initial candidate peteye pixel areas 26.

Figure 3:
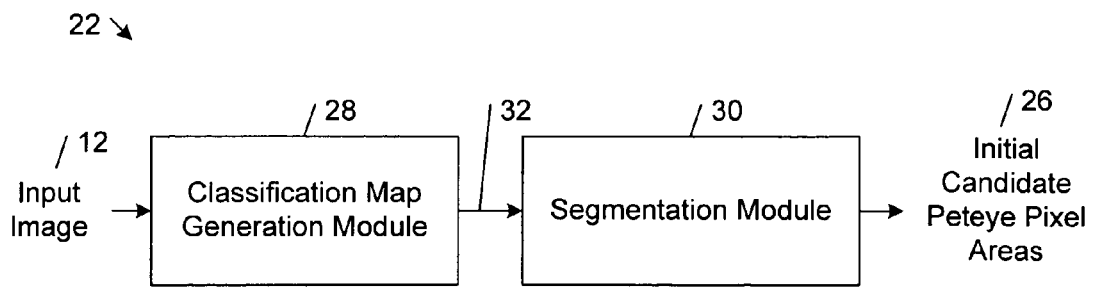
FIG. 3 is a block diagram of components of an embodiment of an initial candidate peteye detection module.

Referring to FIG. 3, in some embodiments, the initial candidate detection module 22 includes a classification map generation module 28 and a segmentation module 30. The classification map generation module 28 generates multiple classification maps 32, each of which segments pixels in the input image 12 into peteye pixels and non-peteye pixels. The segmentation module 30 segments the peteye pixels in the classification maps 32 into the initial candidate peteye pixel areas 26.

The classification map generation module 28 generates each of the classification maps 32 based on a different respective segmentation condition on the values of the pixels. Each of the segmentation conditions is selected to increase the contrast between the pixels that typically are contained in a respective type of peteye area and surrounding non-peteye pixels. In the illustrated embodiments, the segmentation conditions are selected to increase the likelihood of identifying the following common types of peteyes: red peteyes (designated Type I); bright peteyes (designed Type II); non-pet-fur-color peteyes (designated Type III); very bright peteyes (designated Type IV); and bright peteyes with bright surroundings (designated Type V). In an exemplary sample of 227 images containing 402 peteyes, it was observed that Type I peteyes composed approximately 23% of the sample, Type II peteyes composed approximately 33% of the sample, Type III peteyes composed approximately 26% of the sample, Type IV peteyes composed approximately 12% of the sample, and Type V peteyes composed approximately 3% of the sample.

In the embodiments that are described in detail below: the segmentation condition for Type I peteyes is a threshold level of red contrast between red peteyes and their non-red neighbors; the segmentation condition for Type II peteyes is a first threshold level of luminance contrast between bright peteyes and their less bright neighbors; the segmentation condition for Type III peteyes is contrast between non-pet-fur color peteye pixels and their pet-fur colored neighbors, where white is a pet-fur color; the segmentation condition for Type IV peteyes is a second threshold level of luminance contrast between bright peteyes and their less bright neighbors, where the second threshold level of luminance contrast is higher than the first threshold level of luminance contrast used in the segmentation condition for Type II peteyes; the segmentation condition for Type V peteyes is contrast between non-pet-fur color peteye pixels and their pet-fur colored neighbors, where white is a non-pet-fur color.

2. Generating Classification Maps

Figure 4:
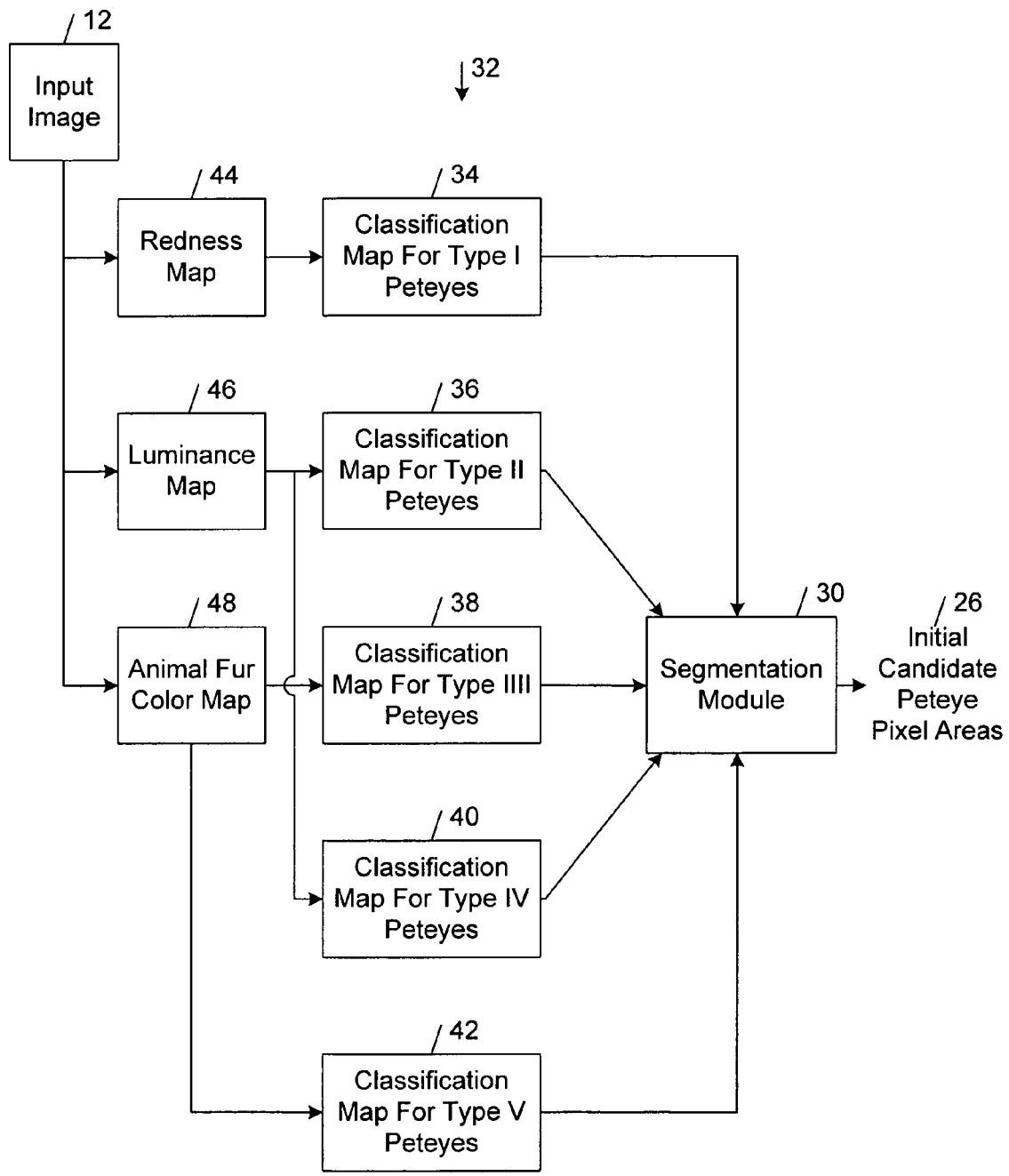
FIG. 4 shows the various maps that are generated in an embodiment of a method of identifying initial candidate peteye pixel areas in an input image.

FIG. 4 shows a set of classification maps 34, 36, 38, 40, 42 that are generated in an embodiment of a method of identifying the initial candidate peteye pixel areas 26 in the input image 12. The classification maps 34-42 may be generated sequentially or in parallel. The classification map 34 segments pixels in the input image 12 into Type I peteye pixels and non-peteye pixels. The classification map 36 segments pixels in the input image 12 into Type II peteye pixels and non-peteye pixels. The classification map 38 segments pixels in the input image 12 into Type III peteye pixels and non-peteye pixels. The classification map 40 segments pixels in the input image 12 into Type IV peteye pixels and non-peteye pixels. The classification map 42 segments pixels in the input image 12 into Type V peteye pixels and non-peteye pixels.

a. Generating Classification Maps for Type I Peteyes

The classification map 34 for Type I peteyes is generated by producing a redness map 44 from the input image 12 and applying to the redness map 44 a redness threshold that segments the pixels of the input image 12 into Type I peteye pixels and non-peteye pixels. The redness map 44 may be produced by mapping the values of the pixels of the input image 12 into a one-dimensional redness color space.

In accordance with one redness color space model, the classification map generation module 28 converts the input image 12 into the CIE L*a*b* color space. The classification map generation module 28 then binarizes the L*a*b* color space representation of the input image 12 based on one or more of the contrast threshold curves that are described in U.S. patent application Ser. No. 10/653,019, filed on Aug. 29, 2003, by Huitao Luo et al., and entitled "DETECTING AND CORRECTING RED-EYE IN AN IMAGE," to produce the classification map 34 for Type I peteyes.

In accordance with another redness color space model, the classification map generation module 28 initially computes measures of pixel redness in the input image 12 to generate the redness map 44. Any one of a variety of different measures of pixel redness may be used to generate the redness map 44 from input image 12. In some embodiments, the pixel redness measures are computed based on a ratio of a measure of a red component of pixel energy to a measure of total pixel energy. For example, in one implementation, pixel redness measures (R0) are computed as follows:

$$R0 = \frac{\alpha \cdot r + \beta \cdot g + \gamma \cdot b}{r + g + b + d} \quad (1)$$

where r, g, and b are red, green, and blue component pixel values of input image 12, respectively, $\alpha$, $\beta$ and $\gamma$ are weighting factors, and d is a prescribed constant with a value selected to avoid singularities and to give higher weights to bright pixels. In one exemplary implementation in which each of r, g, and b have values in the range of [0,255], $\alpha=204$, $\beta=-153$, and $\gamma=51$, and d has a value of 1. Based on the mapping of equation (1), the redness of each pixel of input image 12 is mapped to a corresponding pixel of the redness map 44 having a redness value given by equation (1).

In other embodiments, the redness map 44 is computed using different respective measures of redness. For example, in one exemplary implementation, pixel redness measures (R0) for the redness map 44 are computed as follows: R0= (255·r)/(r+g+b+d) when r>g, r>b; otherwise R0=0. Other representative redness measures (R1, R2, R3, R4) that may be used to compute the redness map 44 are expressed in equations (2)-(5) below:

$$R1 = \frac{r^2}{(r+g+b+1)^2} \quad (2)$$

$$R2 = \frac{r^2}{(g+b)^2} \quad (3)$$

$$R3 = \frac{r+b}{(r+g+b+1)} \quad (4)$$

$$R4 = \frac{Cr}{(Cb+1)^2} \quad (5)$$

where r, g, and b are red, green, and blue component pixel values of input image 12, respectively, and Cr and Cb are the red and blue chrominance component pixel values of the input image 12 in the YCbCr color space.

Next, the classification map generation module 28 binarizes the redness map 44 to produce the classification map 34. In some implementations, the redness map 44 is binarized by applying a linear adaptive threshold filter to the redness map 44. In one exemplary implementation of a linear adaptive threshold filter, the value of each pixel in the redness map 44 is compared with the average of its neighboring pixels, where the neighborhood is defined as a square d×d pixel window, centered at the current pixel. The window size d is defined with respect to the original image size (h×w) as follows:

$$d=\min(h, w)/13 \quad (6)$$

where h and w are the height and width of the original input image. If the current pixel has a higher redness value than its neighborhood average, the filter output is one; otherwise the output is zero.

b. Generating Classification Maps for Type II Peteyes

The classification map 36 for Type II peteyes is generated by producing a luminance map 46 from the input image 12 and applying to the luminance map 46 a luminance threshold that segments the pixels of the input image 12 into Type II peteye pixels and non-peteye pixels. The luminance map 46 may be produced by mapping the values of the pixels of the input image 12 into a one-dimensional luminance color space.

In accordance with one luminance color space model, the classification map generation module 28 initially computes measures of pixel luminance in the input image 12 to generate the luminance map 46. Any one of a variety of different measures of pixel luminance may be used to generate the luminance map 46 from input image 12. In some embodiments, the pixel luminance measures L are computed as follows:

$$L = \frac{u \cdot r + v \cdot g + w \cdot b}{x} \qquad (7)$$

where r, g, and b are red, green, and blue component pixel values of input image 12, respectively, u, v, and w are weighting factors, and x is a prescribed constant.

In one exemplary implementation in which each of r, g, and b have values in the range of [0,255], u=77, v=150, w=29, and x=256. Based on the mapping of equation (7), the luminance of each pixel of the input image 12 is mapped to a corresponding pixel of the luminance map 46 having a luminance value given by equation (7).

Next, the classification map generation module 28 binarizes the luminance map 46 to produce the classification map 36. In some implementations, the luminance map 46 is binarized by applying a linear adaptive threshold filter to the luminance map 46. In one exemplary implementation, the value of each pixel in the luminance map 46 is compared with the average of its neighboring pixels, where the neighborhood is defined as a square d×d pixel window, which is centered at the current pixel, and the window size d is defined with respect to the is original image size (h×w) in accordance with equation (6) above. If the current pixel has a higher luminance value than its neighborhood average, the filter output is one; otherwise the output is zero.

c. Generating Classification Maps for Type III Peteyes

The classification map 38 for Type III peteyes is generated by producing an animal-fur color map 48 from the input image 12 and labeling pixels in the animal-fur color map 48 classified in a specified animal-fur color class as non-peteye pixels and pixels in the animal-fur color map 48 classified in a specified non-animal-fur color class as Type III peteye pixels. The animal-fur color map 48 may be produced by mapping the values of the pixels of the input image 12 into a quantized color space having a finite set of specified colors each of which is defined by a respective color range. In some embodiments, the animal-fur color map 48 is produced by mapping the pixels in the input image 12 into a quantized color space consisting of a set of twenty-seven non-overlapping quantized color bins.

Figure 5:
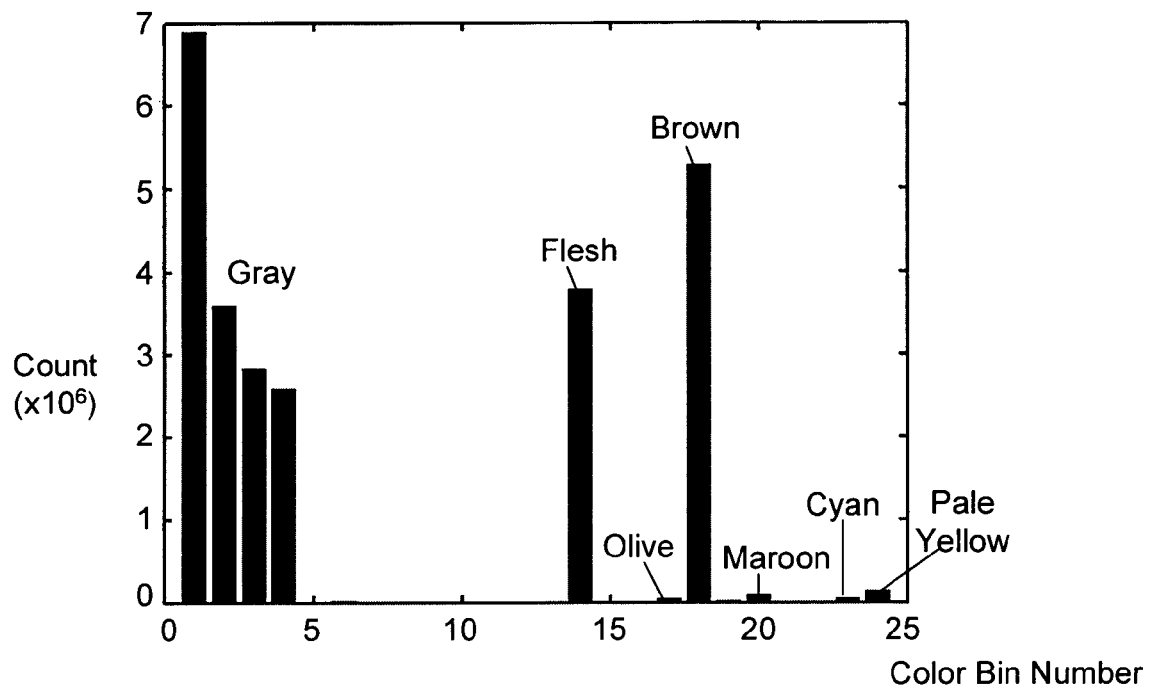
FIG. 5 is a histogram of animal fur colors obtained from a set of images and quantized into a set of predefined color ranges.

It has been discovered from an analysis of a sample of images of animals that animal-fur colors typically can be classified into a small class of possible animal fur colors. In particular, each image in the sample was cropped to remove non-fur-coated areas and the resulting cropped images were mapped to a quantized color space defined by a set of twenty-seven color names (or bins). FIG. 5 shows a histogram of the number of pixels in a sample of sixty-two cropped images classified into respective ones of the twenty-seven color bins. As shown by the histogram, most of the animal-fur color images were classified into a small set of the possible color bins: brown, flesh, and five levels of gray, including white (which corresponds to bin number 0). Equations (13)-(15) below provide an exemplary definition of these animal-fur colors in which the five levels of gray are defined in terms of a single luminance range. The remaining animal-fur colors that were observed (i.e., olive, maroon, cyan, and pale yellow) were found to correspond to specular reflections from animal fur, reflections from other parts of the image (e.g., sky or grass) near the animals, and image artifacts or compression artifacts.

Next, the classification map generation module 28 binarizes the animal-fur color map 48 to produce the classification map 38. In this process, pixels classified in one of the seven possible animal-fur color bins are segmented into a non-peteye class and pixels classified in any of the other (non-animal-fur) color bins are segmented into a Type III peteye class.

In some embodiments, the classification map generation module 28 produces the classification map 38 directly from the input image without producing the animal-fur color map 48 in accordance with the following process:

1. Convert the input image 12 into the YCrCb color space. For example, in some embodiments, if the input image 12 originally is specified in the RGB color space, the input image pixels are mapped into the YCrCb color space as follows:

$$Y = 0.299 \cdot r + 0.587 \cdot g + 0.112 \cdot b \qquad (8)$$

$$Cr = 0.713266 \cdot (r - Y) + 128 \qquad (9)$$

$$Cb = 0.564334 \cdot (b - Y) + 128 \qquad (10)$$

where r, g, and b are red, green, and blue component pixel values of input image 12, respectively, and Y, Cr, and Cb are the component pixel values in the YCrCb color space.

2. Calculate the chroma and hue for each of the input image pixels as follows:

$$\text{Chroma} = 1.88085 \cdot \sqrt{Cr \cdot Cb + Cb \cdot Cb} \qquad (11)$$

$$\text{Hue} = 0.708333 \cdot \text{ArcTangent}\left(\frac{Cr}{Cb}\right) \qquad (12)$$

3. Segment pixels of the input image 12 into the non-peteye class if one of the following conditions is true:

a. the pixel is in a gray color range defined by:

$$\text{Chroma} < 25; \text{ or} \qquad (13)$$

b. the pixel is in a brown color range defined by:

$$(\text{Chroma} < 120) \text{ AND } (Y < 120) \text{ AND } (\text{Hue} \geq 254 \text{ OR Hue} \leq 45); \text{ or} \qquad (14)$$

c. the pixel is in a flesh color range defined by:

$$(\text{Chroma} < 115) \text{ AND } (Y \geq 120) \text{ AND } (10 \leq \text{Hue} \geq 45). \qquad (15)$$

Figure 6:
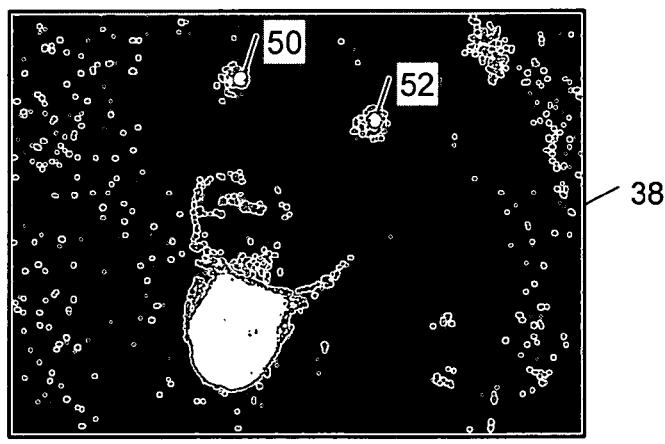
FIG. 6 is an image of a classification map that is derived by segmenting pixels in an image of a dog into an animal-fur color class and a non-animal-fur color class.

FIG. 6 shows a classification map 38 that is derived by segmenting pixels in an image of a dog exhibiting a pair of Type III peteyes 50, 52 into an animal-fur color class (shown by the gray pixels) and a non-animal-fur color class (shown by the white pixels). As shown in the figure, at least for Type III peteyes, there is high contrast between the white pixels in the classification map 38 that correspond to the non-animal-fur color peteyes 50, 52 and the surrounding gray pixels that correspond to animal-fur color pixels.

d. Generating Classification Maps for Type IV Peteyes

The classification map 40 for Type IV peteyes is generated in the same way that the classification map 36 for Type II peteye is generated, except that the luminance threshold used to binarize the luminance map is increased to a higher empirically determined threshold value. For example, in some implementations, if the luminance value of a current pixel is higher than the average neighborhood luminance by an empirically determined additive or multiplicative scale factor, the current pixel is classified as a potential Type IV peteye pixel and set to one in the classification map 40; otherwise the current pixel is classified as a non-Type IV peteye pixel and set to zero in the classification map 40.

e. Generating Classification Maps for Type V Peteyes

The classification map 42 for Type V peteyes is generated in the same way that the classification map 38 for Type III peteye is generated, except that white pixels (e.g., pixels with red, green, and blue component values all equal to 255 in an 8-bit RGB color space representation) are classified as non-animal-fur color pixels.

3. Identifying Initial Candidate Peteye Pixel Areas

In the illustrated embodiment, the classification maps 34-42 are passed to the segmentation module 30, which generates the set of initial candidate peteye pixel areas 26 by generating objects for all the pixels set to one in the classification maps. The segmentation module 30 segments the candidate peteye pixels into peteye and non-peteye classes based on pixel connectivity using any one of a wide variety of pixel connectivity algorithms. Each pixel area that is segmented into the peteye class is labeled as a candidate peteye area. In the embodiments illustrated herein, each candidate peteye area is represented by a boundary rectangle (or box). In other embodiments, the candidate peteye pixel areas may be represented by non-rectangular shapes.

C. Candidate Peteye Verification Module

As explained in detail below, the candidate peteye verification module 24 (FIG. 2) classifies the candidate peteye pixel areas based on consideration of multiple features in parallel using a machine learning framework to verify that candidate peteye pixel areas correspond to actual peteyes in input image 12 with greater accuracy and greater efficiency.

Figure 7:
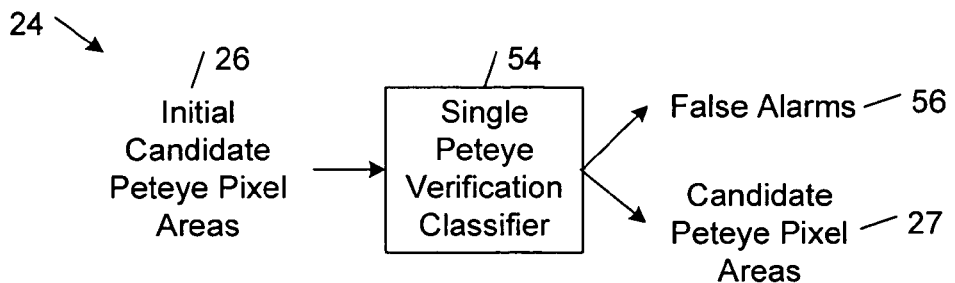
FIG. 7 is a block diagram of an embodiment of a single peteye verification classifier selecting candidate peteye pixel areas from a set of initial candidate peteye pixel areas.

FIG. 7 shows an implementation of the candidate peteye verification module 24 that is implemented by a single peteye verification classifier 54. The single peteye verification classifier filters candidate peteye pixels from the initial set 26 based on a projection of input image data into a feature space spanned by multiple features to generate feature vectors respectively representing the candidate peteye pixel areas 26 in the feature space. Candidate peteye pixel areas in the initial set 26 are filtered out based on the generated feature vectors. In particular, the single peteye verification classifier 54 classifies the candidate peteye pixel area into the set of candidate peteye pixel areas 27 or a set of false alarms 56.

Additional details regarding the structure and operation of the single peteye verification classifier 54, as well as a description of the feature vectors that are used by the single peteye verification classifier 54 to classify the initial candidate peteye pixel areas 26, can be obtained from the description of the single-eye verification classifier contained in U.S. patent application Ser. No. 10/653,019, filed on Aug. 29, 2003, by Huitao Luo et al., and entitled "DETECTING AND CORRECTING RED-EYE IN AN IMAGE."

D. Selecting Ones of the Candidate Peteye Pixel Areas as Detected Pixel Areas

As explained above, the detected peteye pixel area selection module 25 selects the set of detected peteye areas 18 from the set of candidate peteye pixel areas 27 based on user input. In particular, the detected peteye pixel area selection module 25 selects ones of the candidate peteye pixel areas 27 as the detected peteye pixel areas 18 based on the user's selection of areas of the input image 12 that are coincident with respective ones of the candidate peteye pixel areas 27.

Figure 8A:
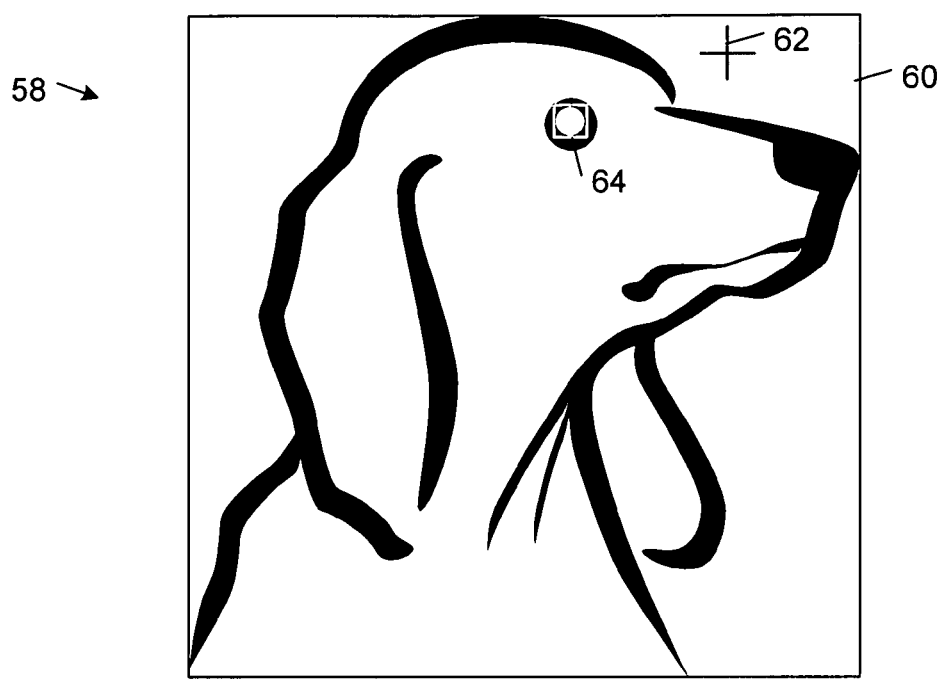
FIG. 8A is a diagrammatic view of an embodiment of a graphical user interface presenting an image of a dog and a user-controlled pointer overlayed on the image.

FIG. 8A shows an embodiment of a graphical user interface 58 presenting an image 60 of a dog and a user-controlled pointer 62 overlayed on the image. FIG. 8A also shows a bounding box 64 that is superimposed on a portion of the eye of the dog shown in the image 60. The bounding box 64 contains one of the candidate peteye pixel areas 27 that were verified by the candidate peteye verification module 24. In some embodiments, the bounding box 64 is hidden from the user. In other embodiments, the bounding box 64 is visible to the user.

Figure 8B:
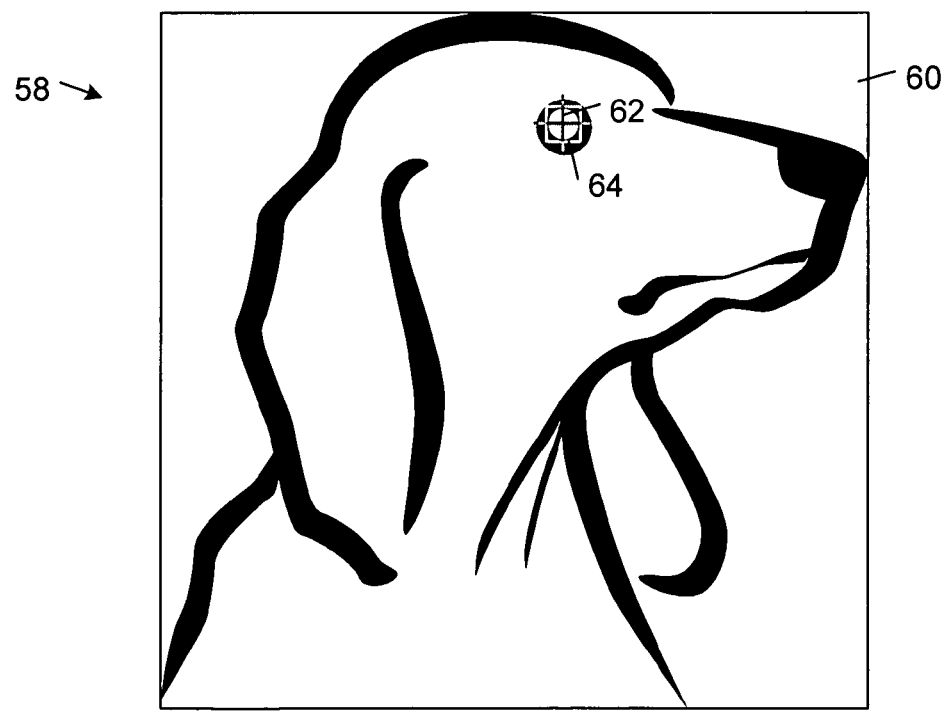
FIG. 8B is a diagrammatic view of the graphical user interface shown in FIG. 8A after a user has moved the pointer over a candidate peteye pixel area.

FIG. 8B shows the graphical user interface 58 after a user has moved the pointer 62 into an area of the image 60 that coincides with the candidate peteye pixel area defined by the bounding box 64. In response to the user's selection of the area of the image 60 specified by the pointer 62 (e.g., by pressing a button on an input device, such as a computer mouse), the detected peteye pixel area selection module 25 selects the candidate peteye pixel area 27 corresponding to the bounding box 64 as one of the detected peteye areas 18.

III. Peteye Correction

Figure 9:
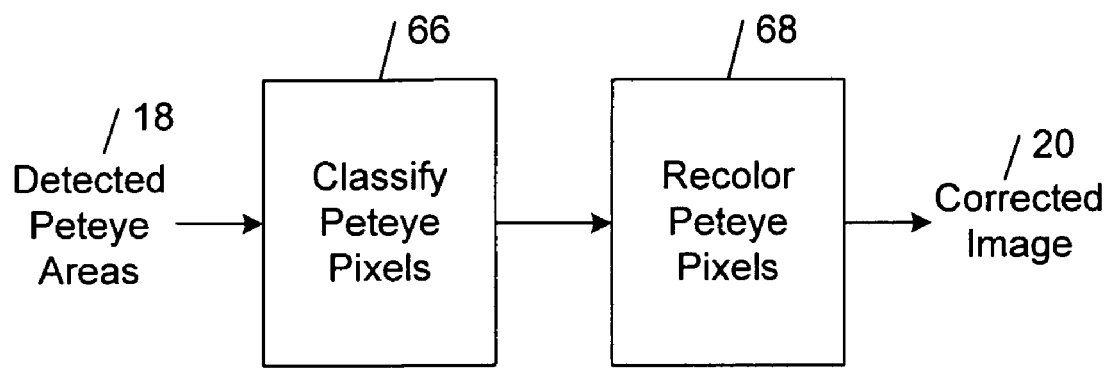
FIG. 9 is a flow diagram of an embodiment of a method of correcting detected peteye pixels.

Referring to FIG. 9, after the detected peteye pixel areas 18 have been selected, the pixels within the detected peteye pixel areas 18 are classified as peteye pixels and non-peteye pixels (block 66). The pixels within each of the detected peteye pixel areas 18 that are classified as peteye pixels are then recolored (block 68).

Figure 10:
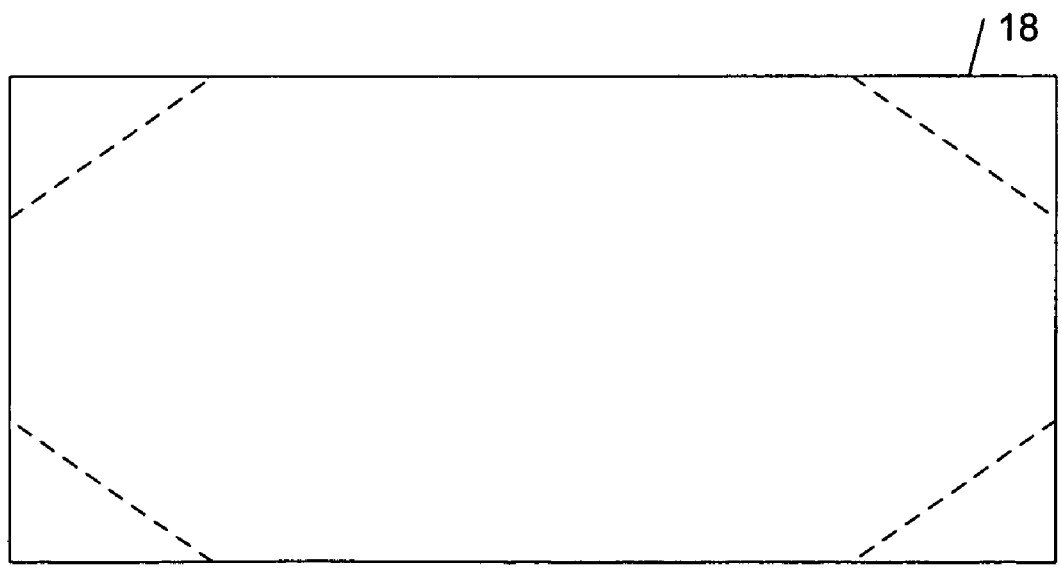
FIG. 10 shows a detected peteye pixel area and cropping lines for corner regions.

Referring to FIG. 10, in some embodiments, before the detected peteye pixel areas 18 are classified, the corners of the detected redeye pixel areas 18 are cropped to form an octagonal shape that approximates the shape typical of animal eye pupils. The amount by which the corners are cropped is empirically determined. In one exemplary illustration, the side dimension of each corner region corresponds to 15% of the corresponding side (horizontal or vertical) dimension of the detected redeye pixel areas 18.

A. Classifying Peteye Pixels

Figure 11:
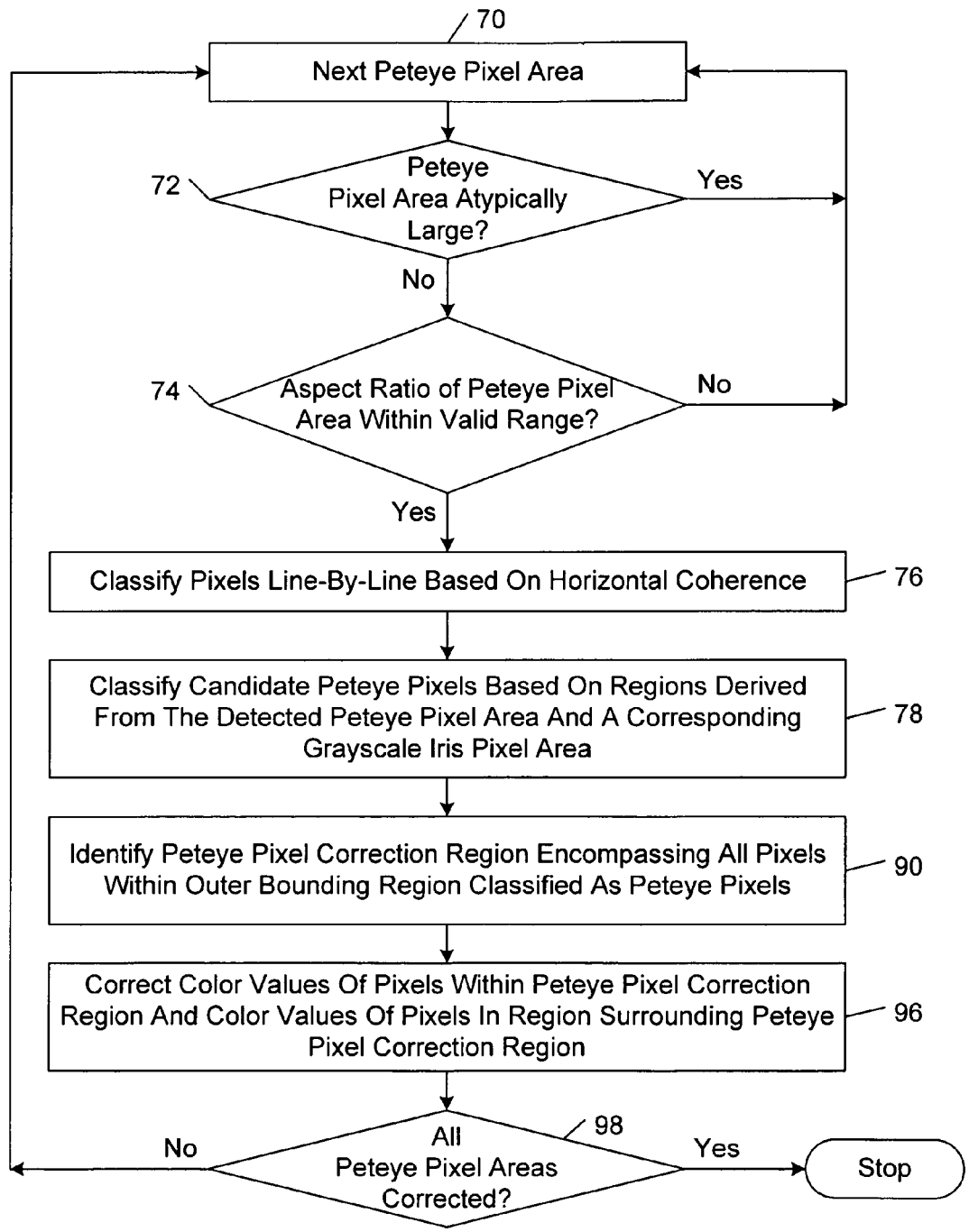
FIG. 11 is a flow diagram of an embodiment of a method of correcting redeye pixels in an image.

FIG. 11 shows an embodiment of a process of classifying peteye pixels in the detected peteye pixel areas 18. In some embodiments, the pixels within each of the detected peteye pixel areas 18 are classified independently of the other peteye pixel areas. In these embodiments, pixel classification also is performed per pixel and per pixel line without any reference to (or coherence with) adjacent (above or below) pixel lines.

In some embodiments, a number of fast heuristics are applied to the candidate peteye areas to eliminate false alarms (i.e., candidate peteye pixel areas that are not likely to correspond to actual peteye areas), including aspect ratio inspection and shape analysis techniques. For example, in some implementations, atypically elongated candidate peteye areas are removed.

In the embodiment shown in FIG. 11, the detected peteye pixel area 18 is skipped and the next detected peteye pixel area 18 is processed (FIG. 11, block 70), if the detected peteye pixel area 18 is atypically large (FIG. 11, block 72). In some implementations, a detected peteye pixel area 18 is considered to be atypically large if any dimension (e.g., width or height) is larger than an empirically determined number of pixels.

The detected peteye pixel area 18 also is skipped if the aspect ratio of the detected peteye pixel area 18 is outside of an empirically determined valid range of aspect ratio values (block 74). The aspect ratio includes the ratio of width-to-height of the corresponding bounding box and the ratio of height-to-width of the corresponding bounding box. In some implementations, the valid range of aspect ratio values is from 1:2 to 2:1.

The pixels in the detected peteye pixel areas that are not too large and that have an aspect ratio within the specified valid range, are classified as candidate peteye pixels and non-candidate peteye pixels line-by-line based on horizontal coherence (FIG. 11, block 76). In some implementations, if a given peteye pixel is located adjacent to a pixel previously classified as a candidate peteye pixel and has a value (i.e., a redness value for Type I peteyes or a luminance value for Type II and Type IV peteyes) that is greater than an empirically determined, type-specific threshold value, then the given pixel also is classified as a candidate peteye pixel. In these implementations, the pixels of Type III peteyes are not classified by horizontal coherence.

Referring to FIGS. 11 and 12A, the pixels in the current detected peteye pixel area 18 are classified as candidate peteye pixels and non-candidate peteye pixels based on regions that are derived from a detected peteye pixel area 18 and a corresponding grayscale iris pixel area (FIG. 11, block 78). In some embodiments, a detected peteye pixel area 18 is represented by a rectangle 80 and the associated iris is represented as a square 82. The iris is assumed to share the same center with the detected peteye pixel area 80. Note that each of the detected peteye area 80 is not necessarily identical to its associated grayscale iris area 82. In some embodiments, the square grayscale iris area 82 is computed over a grayscale plane using the following search algorithm.

Initially, a grayscale map is computed by mapping the pixels of input image 12 in accordance with a grayscale mapping G, given by G=MIN(G1, G2), where MIN is a function that outputs the minimum of G1 and G2, which are given by:

$$G1=0.299 \times r + 0.587 \times g + 0.114 \times b \quad (13)$$

$$G2=0.299 \times (255-r) + 0.587 \times g + 0.114 \times b \quad (14)$$

where r, g and b are red, green and blue values for each pixel within the region and the grayscale values are obtained for each pixel and averaged over the region. In this grayscale mapping, G1 is a standard grayscale mapping computed from (r, g, b), whereas G2 is the grayscale mapping computed from (255-r, g, b). The grayscale mapping G2 handles instances of "glowing" peteyes (i.e., when a peteye appears much brighter than its surroundings). In accordance with the above approach, such atypical "glowing" peteyes are mapped to a grayscale channel that allows them to be treated in the same way as typical peteyes.

Next, a search is performed over the computed grayscale map to locate one or more areas corresponding to irises. In this search, it is assumed that the iris area 82 shares the same center with its detected peteye area 80. The size of the iris area 82 is determined based on a comparison of a candidate square box (box 8 in FIG. 12B) with each of its eight nearest neighbors (boxes 0-7 in FIG. 12B). In one implementation, an initial area that encompasses the surrounding areas 0-7 is partitioned into nine equal-sized nearest neighbor boxes (numbered 0-8). The size of the final optimal grayscale box 82 (or square) is determined by selecting a size that maximizes the grayscale contrast between the center box (box 8) and its surrounding neighbors (boxes 0-7). In this search process, only one variable is involved: the side length of the center box. In one implementation, a brute force search technique is used to determine the final size of grayscale iris area 82.

Referring to FIGS. 11 and 13A, the peteye pixel areas are classified with respect to an inner bounding region 84 and an outer bounding region 86, which are derived from the grayscale iris area 82. The inner bounding region 84 is centered at the center of the detected peteye pixel area 18 being processed and has dimensions (e.g., width and height) that correspond to the average of the dimensions of the detected peteye pixel area 18 and its corresponding grayscale iris area 82. The outer bounding region 86 also is centered at the center of the detected peteye pixel area 18. In one implementation, the dimensions of the outer bounding region 86 are 50% larger than the corresponding dimensions of the inner bounding region 84 if the inner bounding region 84 is larger than two pixels; otherwise, the dimensions of the outer bounding region 86 are 200% larger than the corresponding dimensions of the inner bounding region 84.

The pixels between the inner and outer bounding regions 84, 86 are classified as either candidate peteye pixels or non-candidate peteye pixels based on application of a grayscale threshold to the computed grayscale values of the pixels as follows. In some implementations the green channel in RGB color space is used to approximate the grayscale values of pixels. In one implementation, the applied grayscale threshold corresponds to the average of (1) the average of the grayscale values within the inner bounding region 84 and (2) the average of the grayscale values between the inner and outer bounding regions 84, 86. For example, if the average of the gray values within the inner bounding region 84 is 90 and the average of the gray values outside the inner bounding region 84 but within the outer bounding region 86 is 120, then the average gray value, which is (90+120)/2=105, is the grayscale threshold used to segment the pixels between the inner and outer bounding regions 84, 86. Pixels between the inner and outer bounding regions 84, 86 having grayscale values below the computed grayscale threshold are classified as candidate peteye pixels.

All of the pixels within the outer bounding region 86 shown in FIG. 13A that have been classified as candidate peteye pixels in the process blocks 76 and 78 of FIG. 11 are classified as peteye pixels based on connectivity, with stringent requirements to remove fragments, outliers, and noise.

Referring to FIGS. 11 and 13B, a peteye pixel correction region 88 that encompasses (or encircles) all pixels within the outer bounding region 86 that are classified as peteye pixels is identified (FIG. 11, step 90). In some implementations, the peteye pixel correction region 88 has an elliptical shape. In the illustrated example, the peteye pixel correction region 88 has a circular shape. In addition to the peteye pixel correction region 88, a peteye pixel smoothing region 92 surrounding the peteye pixel correction region 88 is computed. In the example illustrated in FIG. 13B, the peteye pixel smoothing region 92 is defined by a circular boundary 94 that is concentric with the peteye pixel correction region 88 and has a radius that is 50% larger than the radius of the peteye pixel correction region 88.

Referring back to FIG. 11, after the classified peteye pixels have been classified (FIG. 11, blocks 76, 78) and the peteye pixel correction and smoothing regions 88, 92 have been identified (FIG. 11, block 90), the pixels in the detected peteye pixel areas 18 that have been classified as peteye pixels are recolored (FIG. 11, block 96). The process is repeated until all the detected peteye pixel areas have been corrected (FIG. 11, block 98).

B. Recoloring Peteye Pixels

Figure 14:
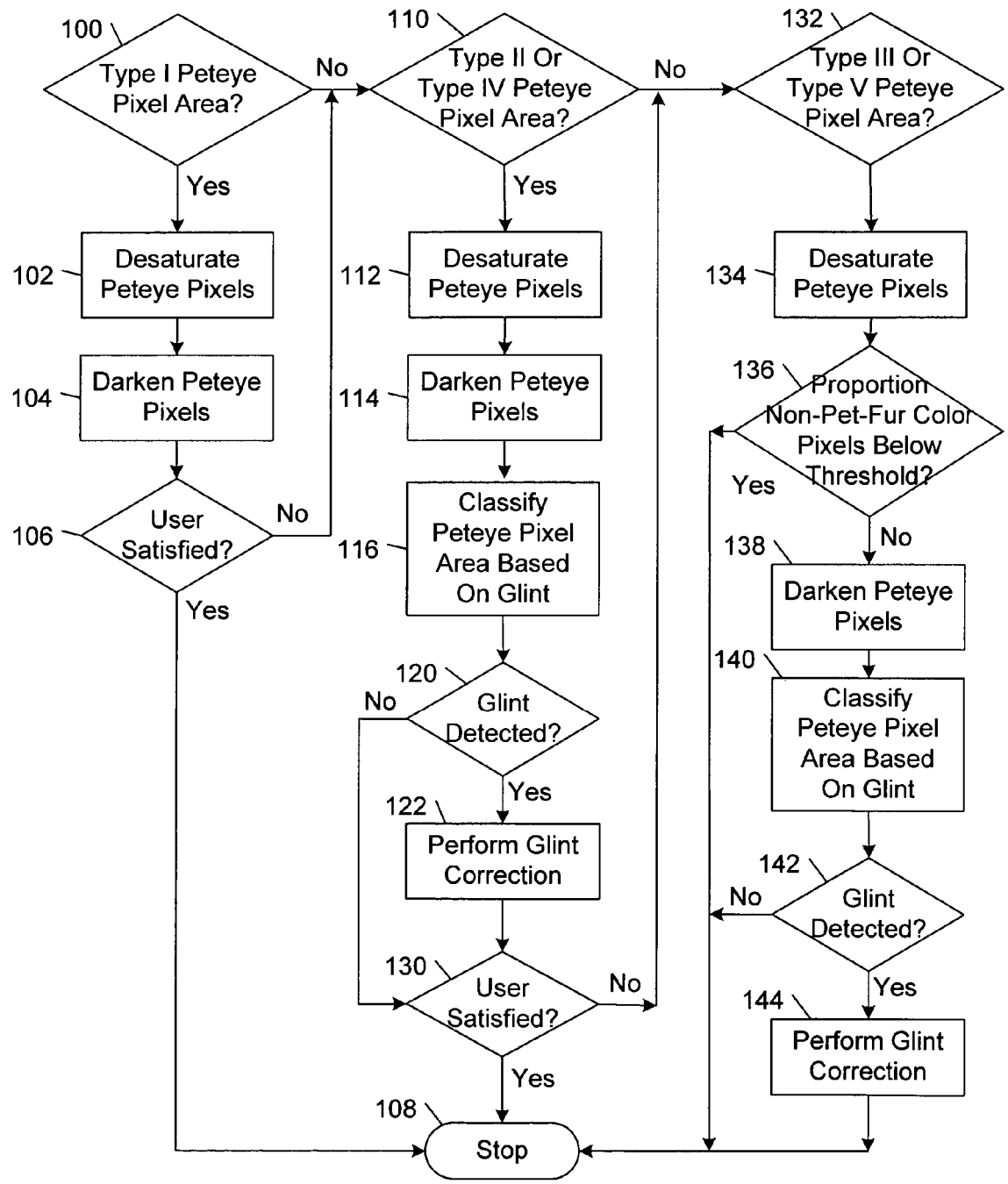
FIG. 14 is a flow diagram of an embodiment of a method of recoloring peteye pixels in detected peteye pixel areas.

The peteye pixels are corrected in accordance with a Type-specified pixel correction process shown in FIG. 14.

1. Recoloring Peteye Pixels in Type I Pixel Areas

If the detected peteye pixel area 18 is a Type I peteye pixel area (FIG. 14, block 100), the peteye pixels in the peteye pixel correction region 88 are corrected as follows.

Color values of the peteye pixels are corrected by desaturating (FIG. 14, block 102) and darkening (FIG. 14, block 104) original color values in accordance with color correction darkening factors and weights that are computed for the peteye pixels to be corrected in accordance with the process described below. The darkening factors and weights indicate how strongly original color values of the peteye pixels are to be desaturated (i.e., pushed towards neutral or gray values). As explained in detail below, these two factors vary with pixel location relative to the center of the peteye pixel correction region 88 to give a smooth transition between the pixels in the input image 12 that are changed and those that are not to avoid artifacts.

Figure 15:
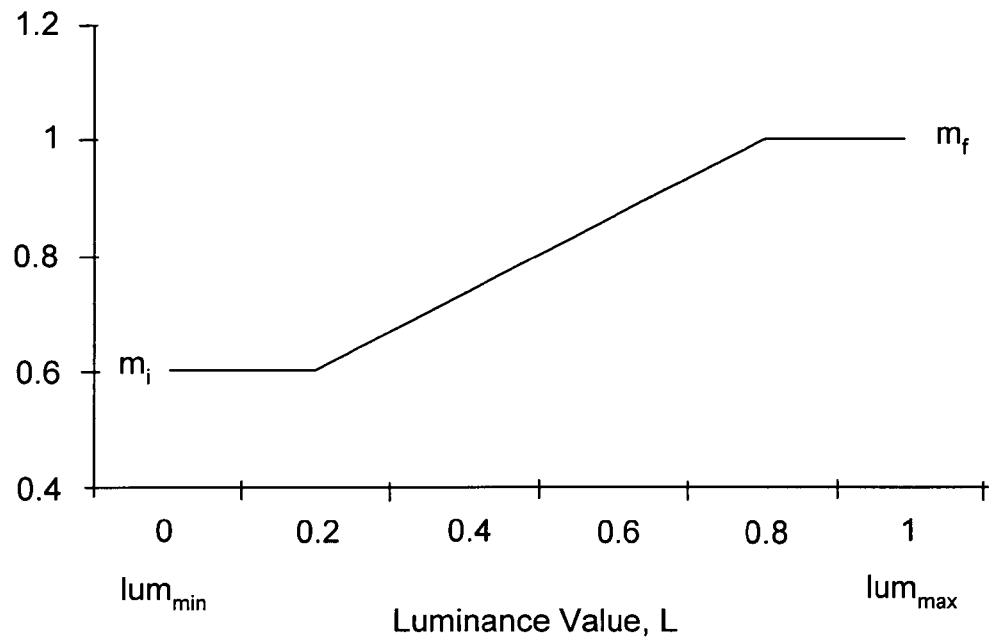
FIG. 15 is a graph of darkening factors plotted as a function of a green color component value of a pixel of an input image.

The darkening factors are computed based on luminance (or gray) values of the input image pixels. In one implementation, the darkening factors are computed based on the graph shown in FIG. 15, where the luminance (or gray) level of each peteye pixel is assumed to vary over a range of $[\text{lum}_{min}, \text{lum}_{max}]=[0, 1]$. In one implementation, the green color channel is used to estimate luminance values. Other implementations may use different estimates or measures of luminance values. In the illustrated implementation, the minimum darkening factor ($m_i$) is set to 0.6 and the maximum darkening factor ($m_f$) is set to 1.0. These parameters may be set to different values in other implementations. In this formulation, the darkening factor values decrease with the darkness levels of the pixels. That is, lower (i.e., darker) luminance (or gray) values are associated with lower darkening factors. Since the darkening factors influence pixel values in a multiplicative way in the implementation described below, darker pixels (i.e., pixels with lower luminance values) identified as peteye pixels are darkened more than lighter pixels (i.e., pixels with higher luminance values).

The weights (wt) are set for a given peteye pixel based on the number of peteye pixels that neighbor the given pixel. For example, in one implementation, the weights may be set as follows:

$$wt = \begin{cases} 0 & \text{peteye neighbors} = 0 \\ .33 & \text{peteye neighbors} = 1, 2, 3 \\ .67 & \text{peteye neighbors} = 4, 5, 6 \\ 1 & \text{peteye neighbors} = 7, 8 \end{cases} \quad (15)$$

where "peteye neighbors" corresponds to the number of peteye pixels that neighbor the given pixel being assigned a weighting factor. In this formulation, peteye pixels near the center of the peteye pixel correction region 88 are assigned higher weights than peteye pixels near the boundaries of the peteye pixel correction region 88.

In some RGB color space implementations, the color values (red, green, blue) of each input image pixel identified as a peteye pixel are corrected to the final color values ($R_1, G_1, B_1$) as follows:

If (mask=1), tmp=dark[green−$\text{grn}_{min}$]
Else tmp=1

$R_1 = (wt*tmp*\text{green} + (1-wt)*\text{red})$ $G_1 = (wt*tmp*\text{green} + (1-wt)*\text{green})$ $B_1 = (wt*tmp*\text{green} + (1-wt)*\text{blue})$ In these embodiments, it is assumed that the color components of the input image pixels are defined with respect to the RGB color space. These embodiments readily may be extended to other color space representations. It is noted that if wt=1, pixel values are pushed all the way to neutral (i.e., the pixel values are set to the same shade of gray). If wt=0, none of the color component values of the corresponding pixel are changed. In this implementation, lower luminance pixels (i.e., smaller green values) generally are pushed darker than higher luminance pixels, which have their luminance unchanged.

The original color values of peteye pixels in the peteye pixel smoothing region 92 are corrected in a similar way as the peteye pixels in the pixel correction region 88, except that the relative amount of correction varies from 90% at the boundary with the peteye pixel correction region 88 to 20% at the boundary 94 of the peteye pixel smoothing region 92. This smoothing or feathering process reduces the formation of disjoint edges in the vicinity of the corrected peteyes in the corrected image.

Referring back to FIG. 14, if the user is satisfied with the results of the desaturating and darkening recoloring processes (FIG. 14, block 106), the peteye pixel correction process is terminated (FIG. 14, block 108). If the user is not satisfied with the results (FIG. 14, block 106), the user may have the peteye pixel detection and correction system 10 re-perform the peteye detection process described above on the corrected image 20. The user may then re-select the previously selected peteye pixel area 64 (FIGS. 8A and 8B) using, for example, the user interface shown in FIGS. 8A and 8B. If the selected area corresponds to a detected peteye pixel area 18, the peteye correction module 16 will recolor the peteye pixels in the detected peteye pixel area 18 in accordance with the process shown in FIG. 11. Since Type I peteye pixel areas have already been corrected, the newly detected peteye pixel areas should correspond to one or more of the other types of peteye pixel areas (i.e., peteye Types II-V).

In some embodiments, a user who is not satisfied with the peteye pixel correction results may select an undo command to return the image to its previous state.

2. Recoloring Peteye Pixels in Type II or Type IV Pixel Areas

Referring to FIG. 14, if the detected peteye pixel area 18 is a Type II peteye pixel area or a Type IV peteye pixel area (FIG. 14, block 110), the peteye pixels in the peteye pixel correction region 88 are corrected as follows.

Initially, the color values of the peteye pixels in Type II and Type IV peteye pixel areas are corrected by desaturating (FIG. 14, block 112) and darkening (FIG. 14, block 114) the original color values in accordance with the processes described above in connection with peteye pixels in Type I peteye pixel areas.

Figure 16:
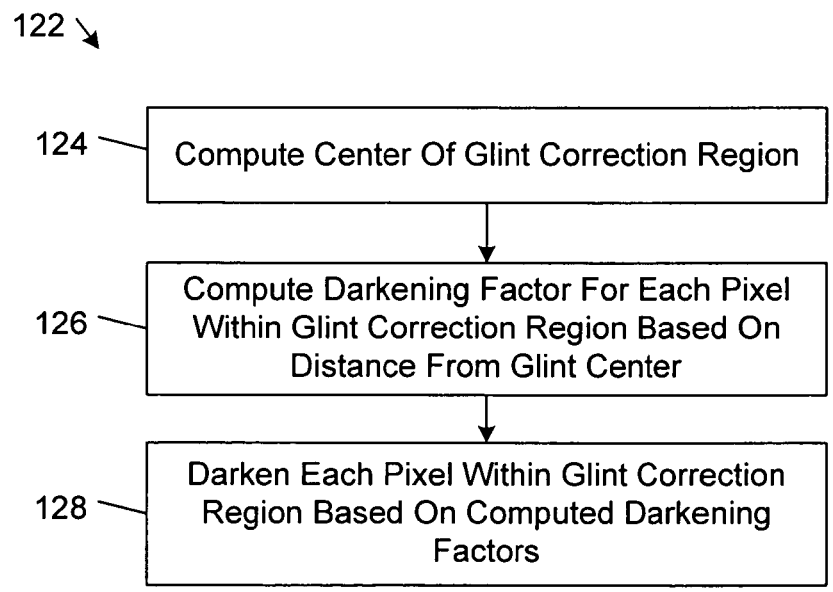
FIG. 16 is a flow diagram of an embodiment of a method of correcting peteye pixel areas containing large glowing glint.
Figure 17:
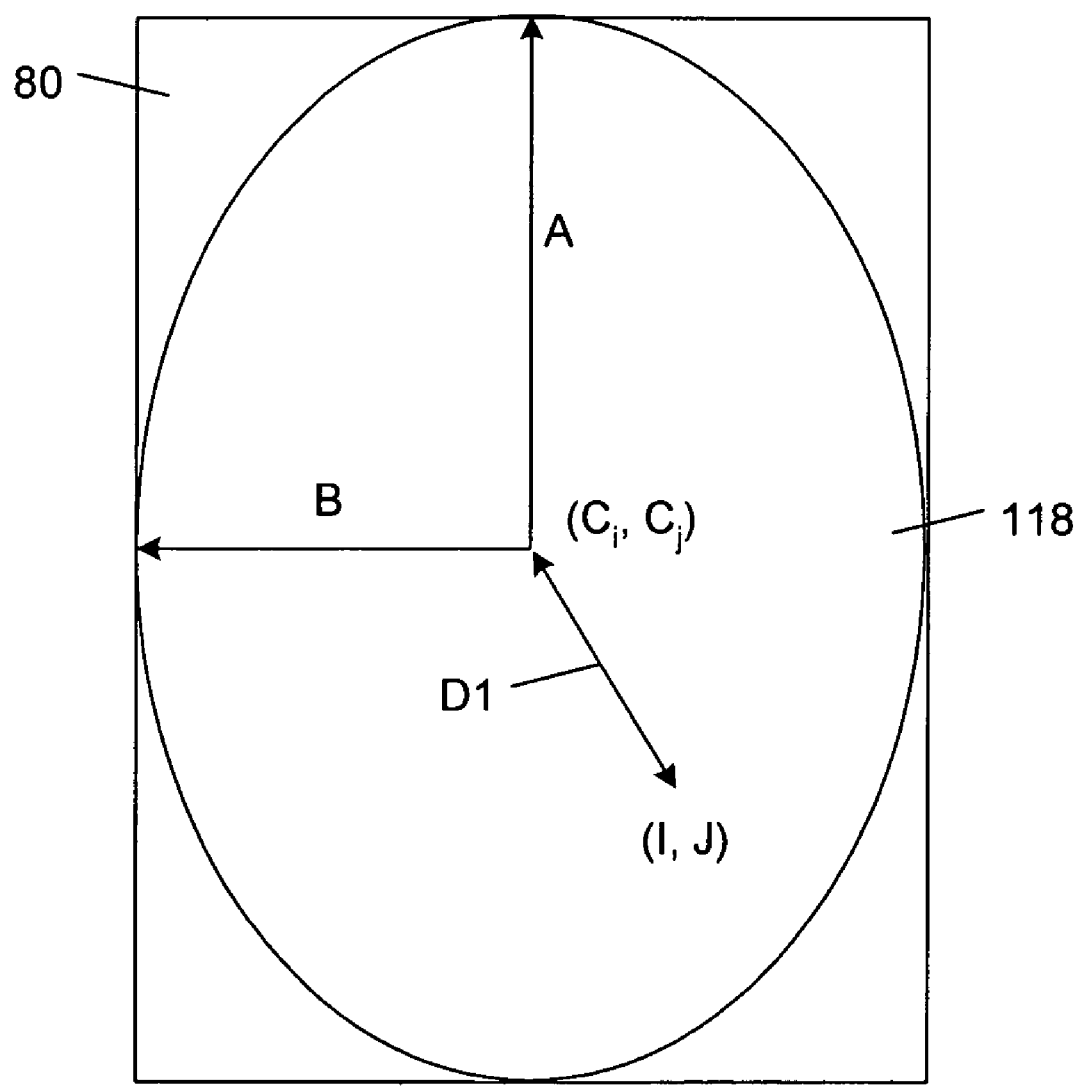
FIG. 17 is a diagrammatic view of a glint correction region inscribed in a peteye pixel area.

Referring to FIGS. 14, 16, and 17, After the desaturating and darkening the peteye pixel areas (FIG. 14, blocks 112, 114), the peteye correction module 16 processes the detected peteye pixel areas as follows to correct large glowing glint.

In this process, the pixels in the detected peteye pixel area are classified based on glint (block 116). In one implementation, peteye pixel areas are classified as containing large glowing glint if the percentage of the non-peteye pixels in an oval glint correction region 118 inscribed in a boundary box 80 corresponding to the detected peteye pixel area 18 is greater than a heuristically determined threshold (see FIG. 17). In another implementation, peteye pixel areas are classified as containing large glowing glint if the average luminance value computed over the oval glint correction region 118 is greater than a heuristically determined threshold. In another implementation, peteye pixel areas are classified as containing large glowing glint if the average luminance value computed over the oval glint correction region 118 is greater than the average luminance value computed over the regions of the boundary box 80 surrounding the oval glint correction region 118 by a heuristically determined threshold.

If a detected peteye pixel area is classified as containing large glowing glint (FIG. 14, block 120), the peteye correction module 16 performs glint correction as follows (FIG. 14, block 122).

Referring to FIG. 16, initially, the center ($C_i, C_j$) of the glint correction region 118 is computed (FIG. 16, block 124; FIG. 17). In one implementations, the center ($C_i, C_j$) of the glint correction region 118 is the location of the pixel with the maximal luminance value. In instances in which there are multiple pixels with the maximal luminance value, the pixel location that is closest to the average of the locations of the pixels with the maximal luminance value is selected as the center ($C_i, C_j$) of the glint correction region 118. For each pixel (i,j) within the oval glint correction region 118, the distance D1 to the center ($C_i, C_j$) of the glint correction region 118 is determined. The darkening factor a for each pixel is computed as follows (FIG. 16, block 126):

$$\alpha = 1.0 - 0.3 \left(\frac{D1}{D2}\right)^{0.005} \quad (16)$$

where $D2 = (A^2 + B^2)^{1/2}$, and A and B correspond to one-half of the lengths the semiminor and semimajor axes of the oval glint correction region 118, respectively. The pixels within the glint correction region 118 are darkened in accordance with the computed darkening factors as follows (FIG. 16, block 128):

$$Red_{FINAL} = \alpha \cdot Red_{INITIAL} \quad (17)$$

$$Green_{FINAL} = \alpha \cdot Green_{INITIAL} \quad (18)$$

$$Blue_{FINAL} = \alpha \cdot Blue_{INITIAL} \quad (19)$$

where $Red_{FINAL}$, $Green_{FINAL}$, and $Blue_{FINAL}$ are the final darkened red, green, and blue color values for the glint corrected pixel, and $Red_{INITIAL}$, $Green_{INITIAL}$, and $Blue_{INITIAL}$ are the initial red, green, and blue color values of the pixel after the desaturating and darkening recoloring processes shown in blocks 112, 114 of FIG. 14.

The original color values of peteye pixels in the peteye pixel smoothing region 92 are corrected in a similar way as the peteye pixels in the pixel correction region 88, except that the relative amount of correction varies from 90% at the boundary with the peteye pixel correction region 88 to 20% at the boundary 94 of the peteye pixel smoothing region 92. This smoothing or feathering process reduces the formation of disjoint edges in the vicinity of the corrected peteyes in the corrected image.

Referring back to FIG. 14, if the user is satisfied with the results of the desaturating and darkening recoloring processes (FIG. 14, block 130), the peteye pixel correction process is terminated (FIG. 14, block 108). If the user is not satisfied with the results (FIG. 14, block 130), the user may have the peteye pixel detection and correction system 10 re-perform the peteye detection process described above on the corrected image 20. The user may then re-select the previously selected peteye pixel area 64 (FIGS. 8A and 8B) using, for example, the user interface shown in FIGS. 8A and 8B. If the selected area corresponds to a detected peteye pixel area 18, the peteye correction module 16 will recolor the peteye pixels in the detected peteye pixel area 18 in accordance with the process shown in FIG. 11. Since Type I, II, and IV peteye pixel areas have already been corrected, the newly detected peteye pixel areas should correspond to one or more of the other types of peteye pixel areas (i.e., peteye Types III and V).

In some embodiments, a user who is not satisfied with the peteye pixel correction results may select an undo command to return the image to its previous state.

3. Recoloring Peteye Pixels in Type III or Type V Pixel Areas

Referring to FIG. 14, if the detected peteye pixel area 18 is a Type III pixel area or a Type V peteye pixel area (FIG. 14, block 132), the peteye pixels in the peteye pixel correction region 88 are corrected as follows.

Initially, the color values of the peteye pixels in Type III and Type V peteye pixel areas are corrected by desaturating (FIG. 14, block 134) the original color values in accordance with the desaturation process described above in connection with peteye pixels in Type I peteye pixel areas.

If the proportion of non-pet-fur color pixels in the detected peteye pixel area constitutes less than an empirically determined threshold (e.g., 40%) (FIG. 14, block 136), the peteye pixel correction process is terminated (FIG. 14, block 108). If the proportion of non-pet-fur color pixels in the detected peteye pixel area is greater than the threshold (FIG. 14, block 136), the peteye pixels are darkened (FIG. 14, block 138) in accordance with the darkening process described above in connection with peteye pixels in Type I peteye pixel areas. In addition, the pixels in the detected peteye pixel area are classified based on glint (FIG. 14, block 140) and if a detected peteye pixel area is classified as containing large glowing glint (FIG. 14, block 142), the peteye correction module 16 performs glint correction (FIG. 14, block 144) in accordance with the glint correction process described above in connection with peteye pixels in Type III and Type V peteye pixel areas.

The original color values of peteye pixels in the peteye pixel smoothing region 92 are corrected in a similar way as the peteye pixels in the pixel correction region 88, except that the relative amount of correction varies from 90% at the boundary with the peteye pixel correction region 88 to 20% at the boundary 94 of the peteye pixel smoothing region 92. This smoothing or feathering process reduces the formation of disjoint edges in the vicinity of the corrected peteyes in the corrected image.

IV. CONCLUSION

The embodiments that are described in detail herein are designed specifically to detect and correct peteyes in images. As a result, these embodiments are capable of satisfactorily detecting and correcting the majority of peteyes that appear in images. Some of these embodiments are able to detect a wide variety of different peteyes using multiple classification maps that segment pixels into peteye pixels and non-peteye pixels. Each of the classification maps is generated based on a different respective segmentation condition on the values of the pixels, where each segmentation condition is selected to increase the contrast between the pixels typically contained in a respective type of peteye area and surrounding non-peteye pixels. In some embodiments, the contrast between peteye pixels and non-peteye pixels is increased by segmenting pixels into a specified animal-fur color class and a non-animal-fur color class. In addition, some of these embodiments apply type-specific peteye color correction processes to the peteye pixels in the detected peteye pixel areas to generate a corrected image.

Other embodiments are within the scope of the claims.

What is claimed is:

1. A method of processing an input image, comprising operating a computer to perform operations comprising:

detecting peteye pixel areas of a first type in the input image based on a first classification map segmenting pixels in the input image into peteye pixels of the first type and non-peteye pixels of the first type based on a first segmentation condition on values of the pixels in the input image;

detecting peteye pixel areas of a second type in the input image based on a second classification map segmenting pixels in the input image into peteye pixels of the second type and non-peteye pixels of the second type based on a second segmentation condition on values of the pixels in the input image, wherein the first and second segmentation conditions are different;

correcting the detected peteye pixel areas of the first type in accordance with a first color correction process; and correcting the detected peteye pixel areas of the second type in accordance with a second color correction process that is different from the first color correction process.

2. The method of claim 1, wherein the detecting of peteye pixels of the first type comprises generating a redness map based on a mapping of the pixel values in the input image into a one-dimensional redness space and applying to the redness map a redness threshold that segments the pixels into peteye pixels of the first type and non-peteye pixels of the first type to produce the first classification map.

3. The method of claim 2, wherein the detecting of the peteye pixel areas of the first type comprises identifying candidate peteye pixels areas of the first type in the first classification map, selecting ones of the identified candidate peteye pixel areas as the detected peteye pixel areas of the first type, and classifying pixels in the detected peteye pixel areas into one of a peteye pixel class of the first type and a non-peteye pixel class of the first type, and desaturating and darkening ones of the input image pixels classified in the peteye pixel class of the first type.

4. The method of claim 3, wherein the detecting of peteye pixels of the second type comprises generating a luminance map based on a mapping of the pixel values in the input image into a one-dimensional luminance space and applying to the luminance map a luminance threshold that segments the pixels into peteye pixels of the second type and non-peteye pixels of the second type to produce the second classification map.

5. The method of claim 4, further comprising:
detecting peteye pixel areas of a third type in the input image based on a third classification map segmenting pixels in the input image into peteye pixels of the third type and non-peteye pixels of the third type based on a third segmentation condition on values of the pixels in the input image, wherein the first, second and third segmentation conditions are different, and the detecting of the peteye pixels areas of the third type comprises applying to the luminance map a second luminance threshold that segments the pixels into peteye pixels of the third type and non-peteye pixels of the third type to produce the third classification map, and the first and second luminance thresholds are different; and correcting the detected peteye pixel areas of the third type in accordance with a third color correction process that is different from the first and second color correction processes.

6. The method of claim 4, wherein the detecting of the peteye pixel areas of the first type comprises:
identifying candidate peteye pixels areas of the second type in the second classification map;
selecting ones of the identified candidate peteye pixel areas as the detected peteye pixel areas of the second type;
classifying pixels in the detected peteye pixel areas of the second type into one of a peteye pixel class of the second type and a non-peteye pixel class of the second type;
desaturating and darkening ones of the input image pixels classified in the peteye pixel class of the second type;
identifying glint correction regions in the detected peteye pixel areas of the second type; and
further darkening ones of the input image pixels in the identified glint correction regions.

7. The method of claim 3, wherein the detecting of peteye pixels of the second type comprises segmenting pixels in the input image into an animal-fur color class and a non-animal-fur color class, and generating the second classification map by labeling pixels of the input image in the animal-fur color class as non-peteye pixels and labeling pixels in the input image in the non-animal-fur color class as peteye pixels.

8. The method of claim 7, wherein the segmenting of the pixels in the input image into an animal-fur color class and a non-animal-fur color class comprises segmenting into the animal-fur color class pixels in the input image having values corresponding to one of multiple specified gray levels, a specified brown color range, and a specified flesh color range, wherein one of the gray levels is white.

9. The method of claim 8, further comprising detecting peteye pixel areas of a third type in the input image based on a third classification map segmenting pixels in the input image into peteye pixels of the third type and non-peteye pixels of the third type based on a third segmentation condition on values of the pixels in the input image, wherein the first, second and third segmentation conditions are different, the detecting of the peteye pixels areas of the third type comprises segmenting pixels in the input image into a second animal-fur color class and a second non-animal-fur color class, and the segmenting of the pixels in the input image into a second animal-fur color class comprises segmenting into the second animal-fur color class pixels in the input image having values corresponding to one of the multiple specified gray levels excluding white, the specified brown color range, and the specified flesh color range.

10. The method of claim 7, wherein the segmenting of the pixels in the input image into an animal-fur color class and a non-animal-fur color class comprises segmenting into the animal-fur color class pixels having a chroma value below a chroma level threshold.

11. The method of claim 7, wherein the segmenting of the pixels in the input image into an animal-fur color class and a non-animal-fur color class comprises segmenting into the animal-fur color class pixels having a chroma value below a chroma level threshold, a luminance value below a luminance threshold, and a hue value outside a hue range defined by a lower hue threshold and an upper hue threshold.

12. The method of claim 7, wherein the segmenting of the pixels in the input image into an animal-fur color class and a non-animal-fur color class comprises segmenting into the animal-fur color class pixels having a chroma value below a chroma level threshold, a luminance value above a luminance threshold, and a hue value within a hue range defined by a lower hue threshold and an upper hue threshold.

13. The method of claim 7, further comprising identifying candidate peteye pixels areas of the second type in the second classification map, selecting ones of the identified candidate peteye pixel areas as the detected peteye pixel areas of the second type, and classifying pixels in the detected peteye areas of the second type into one of a peteye pixel class of the second type and a non-peteye pixel class of the second type, and desaturating ones of the input image pixels classified in the peteye pixel class of the second type.

14. The method of claim 13, further comprising darkening ones of the input image pixels in the detected peteye pixel areas of the second type classified in the peteye pixel class of the second type.

15. The method of claim 14, wherein none of the input image pixels classified in the peteye pixel class of the second type in respective ones of the detected peteye pixel areas of the second type is darkened in response to a determination that the pixels that are classified in the non-animal-fur color class constitute respective proportions of the respective detected peteye pixel areas of the second type that are below a threshold value.

16. The method of claim 13, further comprising identifying glint correction regions in the detected peteye pixel areas of the second type and darkening ones of the pixels in the determined glint correction regions.

17. The method of claim 16, wherein none of the input image pixels classified in the peteye pixel class of the second type in respective ones of the glint correction regions is darkened in response to a determination that the pixels that are classified in the non-animal-fur color class constitute respective proportions of the respective detected peteye pixel areas of the second type that are below a threshold value.

18. The method of claim 13, wherein the identifying of the candidate peteye pixels areas of the first and second types comprises segmenting connected ones of the peteye pixels in the classification map into the candidate peteye pixel areas.

19. The method of claim 1, further comprising selecting as detected peteye areas ones of the identified candidate peteye pixel areas at locations in the input image coincident with a location of a user-controlled pointer in a representation of the input image presented on a graphical user interface.

20. The method of claim 1, wherein the correcting of the detected peteye pixel areas of the first and second types comprises recoloring ones of the pixels in the detected peteye pixel areas of the first and second types.

21. A system for processing an input image, comprising computing hardware operable to perform operations comprising:
   detecting peteye pixel areas of a first type in the input image based on a first classification map segmenting pixels in the input image into peteye pixels of the first type and non-peteye pixels of the first type based on a first segmentation condition on values of the pixels in the input image;
   detecting peteye pixel areas of a second type in the input image based on a second classification map segmenting pixels in the input image into peteye pixels of the second type and non-peteye pixels of the second type based on a second segmentation condition on values of the pixels in the input image, wherein the first and second segmentation conditions are different;
   correcting the detected peteye pixel areas of the first type in accordance with a first color correction process; and
   correcting the detected peteye pixel areas of the second type in accordance with a second color correction process that is different from the first color correction process.

22. A machine-readable medium storing machine-readable instructions for causing a machine to perform operations comprising:
   detecting peteye pixel areas of a first type in the input image based on a first classification map segmenting pixels in the input image into peteye pixels of the first type hand non-peteye pixels of the first type based on a first segmentation condition on values of the pixels;
   detecting peteye pixel areas of a second type in the input image based on a second classification map segmenting pixels in the input image into peteye pixels of the second type and non-peteye pixels of the second type based on a second segmentation condition on values of the pixels in the input image, wherein the first and second segmentation conditions are different;
   correcting the detected peteye pixel areas of the first type in accordance with a first color correction process; and
   correcting the detected peteye pixel areas of the second type in accordance with a second color correction process that is different from the first color correction process.

* * * * *